US012049126B2

(12) United States Patent
Plourde, Jr. et al.

(10) Patent No.: US 12,049,126 B2
(45) Date of Patent: Jul. 30, 2024

(54) VEHICLE SLIDING DOOR SYSTEM

(71) Applicant: MAGNA INTERNATIONAL INC., Aurora (CA)

(72) Inventors: Lawrence Michael Plourde, Jr., Macomb, MI (US); Ryan Robert Warpup, Orion, MI (US); David Wayne Cummings, Clinton Township, MI (US); Sten Ermond Burris, Oxford, MI (US); Arun Kumar Reddyvaripalli Narayanaswamy, Troy, MI (US)

(73) Assignee: MAGNA INTERNATIONAL INC., Aurora (CA)

( * ) Notice: Subject to any disclaimer, the term of this patent is extended or adjusted under 35 U.S.C. 154(b) by 568 days.

(21) Appl. No.: 17/288,012

(22) PCT Filed: Oct. 23, 2019

(86) PCT No.: PCT/US2019/057604
§ 371 (c)(1),
(2) Date: Apr. 23, 2021

(87) PCT Pub. No.: WO2020/086682
PCT Pub. Date: Apr. 30, 2020

(65) Prior Publication Data
US 2021/0394595 A1 Dec. 23, 2021

Related U.S. Application Data

(60) Provisional application No. 62/749,180, filed on Oct. 23, 2018.

(51) Int. Cl.
*B60J 5/06* (2006.01)
(52) U.S. Cl.
CPC .................................. *B60J 5/06* (2013.01)
(58) Field of Classification Search
CPC ...... B60J 5/06; E05Y 2201/484; E05Y 2201/624; E05Y 2201/64; E05Y 2201/684;
(Continued)

(56) References Cited

U.S. PATENT DOCUMENTS 3,935,674 A 2/1976 Williams et al.
5,896,704 A 4/1999 Neag et al.
(Continued)

FOREIGN PATENT DOCUMENTS

JP 2017137679 A * 8/2017 ............ E05C 17/02

*Primary Examiner* — Pinel E Romain
(74) *Attorney, Agent, or Firm* — Dickinson Wright PLLC

(57) ABSTRACT

A system for opening and closing a sliding vehicle door includes a vehicle door that engages with the body in the closed position. A longitudinal track is fixedly mounted to an interior of the vehicle door. A hinged bracket is fixedly mounted to the vehicle body adjacent an opening defined by the vehicle body. The hinged bracket has a laterally compressed shape when the door is closed, and expands laterally outward when the door is opened. The door and the track fixed thereto slide longitudinally along the opened hinged bracket when the door is opened. The interface between the hinged bracket and the track remains at the same generally location relative to the vehicle body, and shifts relative to the vehicle door when the door is opened.

16 Claims, 5 Drawing Sheets

(58) Field of Classification Search
CPC ........... E05Y 2900/51; E05Y 2900/531; E05D 15/1002; E05D 15/1007; E05D 15/101
USPC .................................................... 296/146.12
See application file for complete search history.

(56) References Cited

U.S. PATENT DOCUMENTS

| | | | |
|---|---|---|---|
| 6,382,705 B1* | 5/2002 | Lang | B60J 5/06 49/248 |
| 7,887,118 B2 | 2/2011 | Elliott et al. | |
| 7,950,439 B2* | 5/2011 | Anderson | E05D 15/58 160/195 |
| 8,925,248 B2* | 1/2015 | Maruyama | B60J 5/047 49/164 |
| 9,050,878 B2 | 6/2015 | Hendren et al. | |
| 9,074,398 B2* | 7/2015 | Maruyama | E05D 15/48 |
| 10,676,974 B2* | 6/2020 | Wojdyla | A61G 3/062 |
| 2005/0062313 A1 | 3/2005 | Barczynski et al. | |
| 2013/0205668 A1 | 8/2013 | Neag et al. | |
| 2014/0046551 A1* | 2/2014 | Ojima | B60J 5/047 701/49 |
| 2019/0061489 A1* | 2/2019 | Hoggarth | B60J 5/06 |

* cited by examiner

VEHICLE SLIDING DOOR SYSTEM

CROSS-REFERENCE TO RELATED APPLICATIONS

This U.S. National Stage Patent Application claims the benefit of PCT International Patent Application Serial No. PCT/US2019/057604 filed Oct. 23, 2019 entitled "VEHICLE SLIDING DOOR SYSTEM" which claims the benefit of and priority to U.S. Provisional Patent Application Ser. No. 62/749,180 filed on Oct. 23, 2018, titled "Vehicle Sliding Door System," the entire disclosures of which are hereby incorporated by reference.

TECHNICAL FIELD

The present disclosure relates to vehicle sliding door mechanisms. More particularly, the present disclosure relates to a sliding door mechanism with a guide track mounted to the vehicle door.

BACKGROUND OF THE DISCLOSURE

Passenger vehicles include openings formed in the vehicle body in which passengers can enter and exit the vehicle. These openings include doors that are mounted to the vehicle body that open and close to allow passengers or cargo to be loaded and an unloaded into and out of the vehicle. Many doors are in the form of hinged doors, where the door pivots away from the vehicle body to open and pivots toward the vehicle body to close. Other doors are in the form of sliding doors, in which the door translates laterally away from the vehicle body and then slides longitudinally along the side of the vehicle to open.

Sliding door arrangements for a vehicle typically include tracks mounted to the vehicle body, and support arms mounted to the door having roller bearings or other bearing structure that extend into the track. The path of the door is controlled by the shape of the track, in which the track will extend laterally into the vehicle body to provide a laterally outward path to move the door laterally away from the vehicle body at the beginning of travel.

To support the door, the support arms must be sized and arranged to sufficiently support the weight of the door both during and after travel. The support arms are therefore also disposed within the vehicle body when the door is closed. The support arms are typically not exposed to the passengers within the vehicle when the door is closed, and therefore the vehicle body must include a cavity formed between the vehicle body structure and the interior cabin. This results in reduced interior cabin space.

In view of the foregoing, there remains a need for improvements to sliding door mechanisms in vehicles.

SUMMARY OF THE INVENTION

A system for a sliding door in a vehicle is provided and includes a vehicle body defining an opening and a vehicle door configured to engage the opening in a closed position and to disengage from the opening in an open position. The vehicle door is offset laterally and translated longitudinally relative to the vehicle body in the open position relative to the closed position.

The system includes a longitudinal track fixed to the vehicle door and a hinged bracket fixed to the vehicle body adjacent the opening of the vehicle body and interfacing with the longitudinal track. The hinged bracket is moveable between a first position and a second position. When the door is in the closed position, the hinged bracket is in the first position and is laterally compressed and when the door is open, the hinged bracket is in the second position and is laterally expanded, and track is translated longitudinally relative to the body and the hinged bracket.

In one aspect, the longitudinal track is fixed to the inner surface of the vehicle door.

In one aspect, the hinged bracket is longitudinally fixed to the vehicle body.

In one aspect, the hinged bracket is mounted to an outer surface of the vehicle body, and is disposed between the outer surface of the vehicle body and the inner surface of the vehicle door when the vehicle door is in the closed position.

In one aspect, the outer surface of the vehicle body defines a recessed pocket, and the hinged bracket is disposed within the recessed pocket.

In one aspect, the hinged bracket includes a fixed flange portion mounted to the vehicle body.

In one aspect, the hinged bracket includes a pivot arm portion pivotably connected to the fixed flange portion.

In one aspect, the pivot arm portion is biased away from the flange portion.

In one aspect, the hinged bracket includes a door carrier bracket attached to the pivot arm, wherein the door carrier bracket is coupled to the longitudinal track.

In one aspect, when the door moves from the closed position to the open position, the pivot arm portion pivots outward relative to the flange portion, the door carrier bracket shifts laterally outward when the pivot arm portion pivots outward, and the longitudinal track translates longitudinally relative to the door carrier bracket.

In one aspect, the hinged bracket includes a first carrier bracket coupled to the longitudinal track, wherein the longitudinal track is a first longitudinal track, and the first longitudinal track and hinged bracket define a first interface location, the system further comprising a second and third carrier bracket coupled to a respective second and third longitudinal track, wherein the second and third longitudinal tracks are fixed to the vehicle body and the second and third carrier brackets are fixed to the vehicle door, wherein the second carrier bracket and second longitudinal track define a second interface location and the third carrier bracket and third longitudinal track define a third interface location, wherein second and third carrier brackets translate with the vehicle door when the vehicle door is opened such that the second and third interface locations are different when the vehicle door is open relative to the when the vehicle door is closed.

In one aspect, the first interface location is disposed above the second interface location, and the second interface location is disposed above the third interface location, and the second and third interface location are offset longitudinally.

In one aspect, the third interface location is spaced further from the first interface location in the closed position relative to the open position, and the second interface location is closer to the first interface location in the closed position relative to the open position, and the second and third interface locations are spaced apart at approximately the same distance in both the open and closed positions.

In one aspect, the second and third longitudinal tracks are offset longitudinally, and the first longitudinal track is longitudinally aligned with the third longitudinal track in the closed position and the first longitudinal track is aligned with the second longitudinal track in the open position.

In another aspect, a method for opening a sliding door of a vehicle is provided. The method includes releasing a vehicle door from engagement with an opening defined by a vehicle body, opening a hinged bracket laterally outward relative to the vehicle body, wherein the hinged bracket is fixedly attached to the vehicle body and longitudinally slidably attached to a longitudinal track that is fixedly mounted to the vehicle door. The opening of the hinged bracket shifts the vehicle door laterally outward relative to the body. The method further includes longitudinally translating the longitudinal track and the vehicle door relative to the hinged bracket to longitudinally open the vehicle door.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 2:
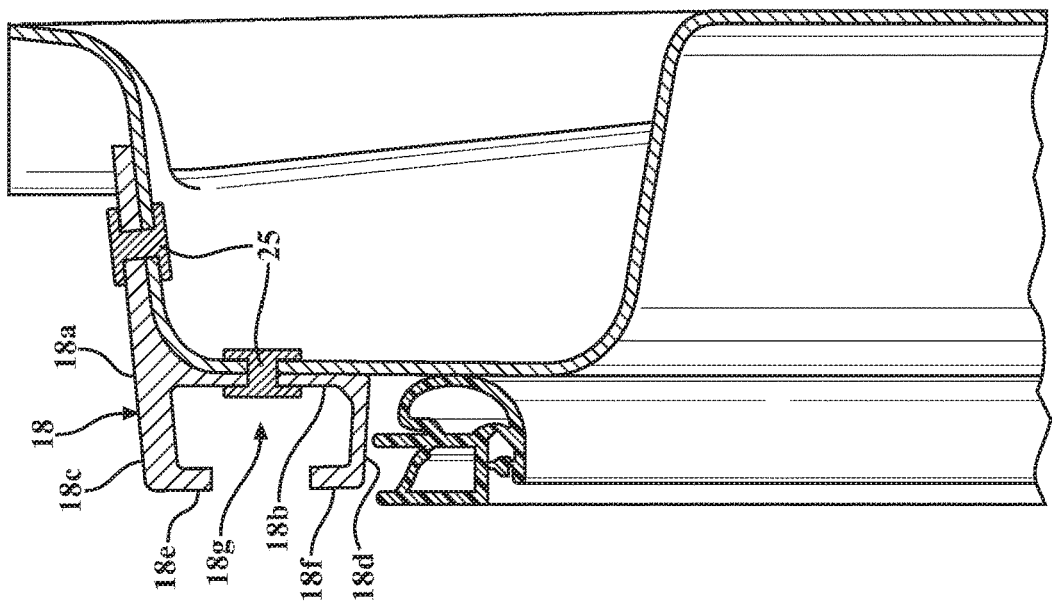
FIG. 2 illustrates a cut-away side view of the door and the cross-section of the track mounted thereto.

Referring to FIGS. 1-11, a sliding door system 10 for a vehicle is provided, including a vehicle body 12, a door 14, a hinge 16, and a track 18. The door 14 is configured to mate with the vehicle body 12 when closed to seal the opening defined by the vehicle body 12. Accordingly, the vehicle body 12 and the door 14 have corresponding respective outer and inner surfaces/shapes.

Figure 1:
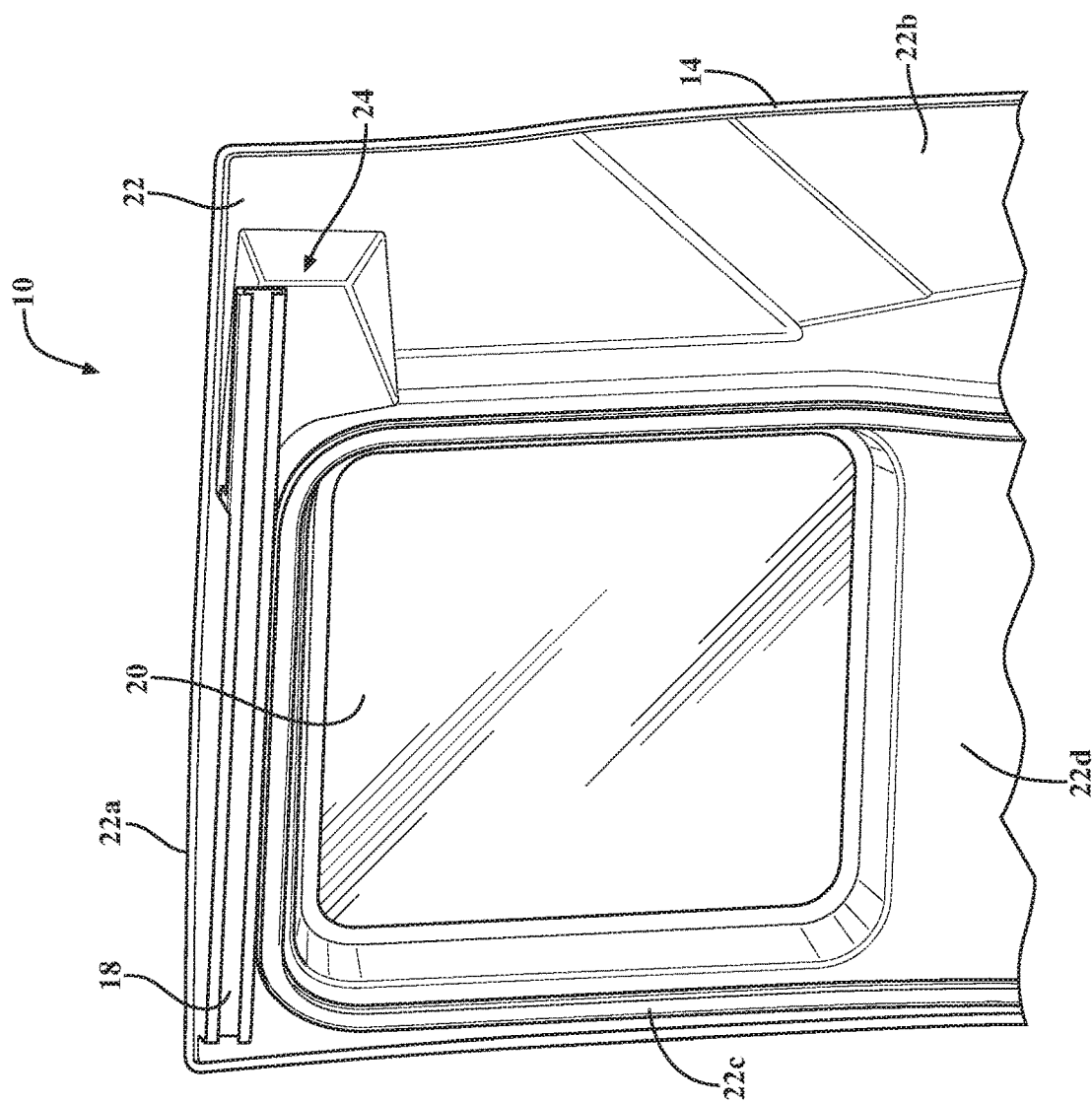
FIG. 1 illustrates a sliding door having a track mounted to a panel portion of the door above a window portion of the door.
Figure 4:
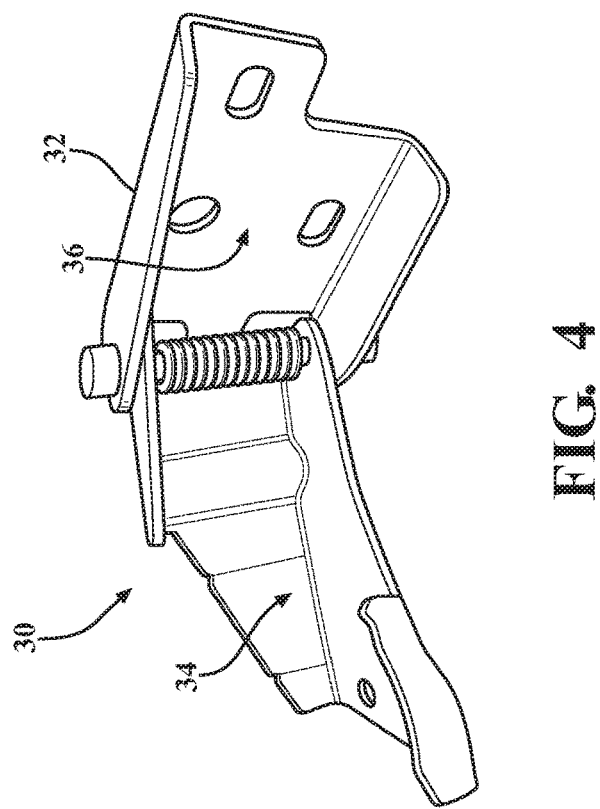
FIG. 4 is an isometric view of the hinged bracket.
Figure 3:
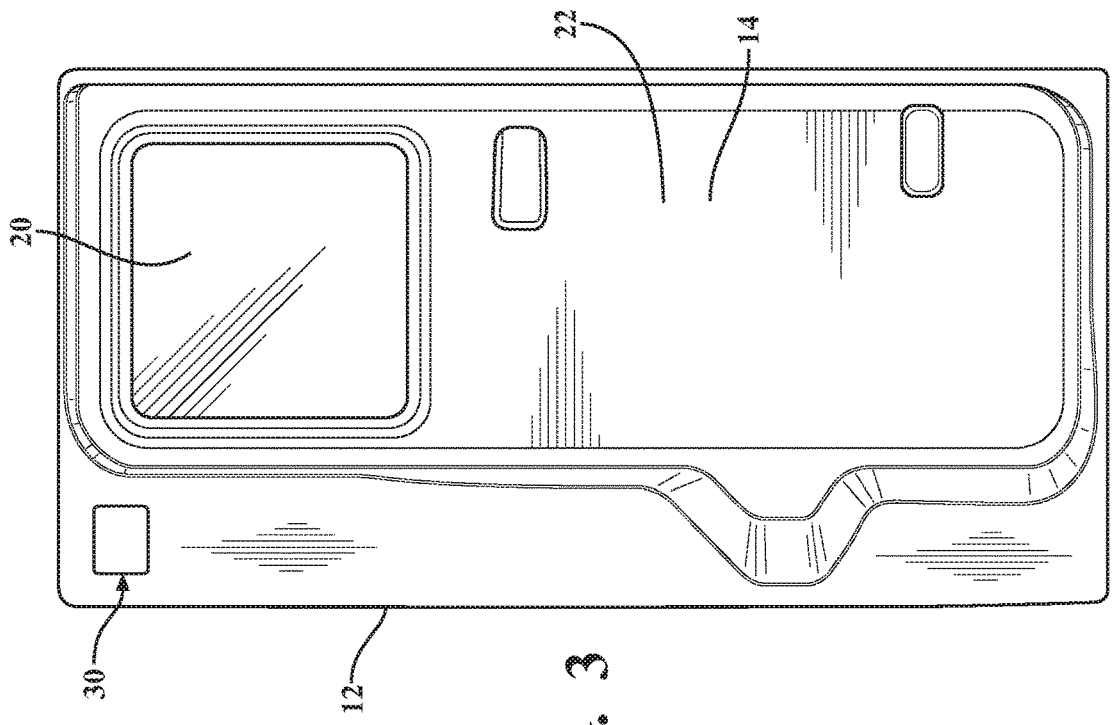
FIG. 3 illustrates an outer view of the door and the location of a hinged bracket relative to the door when the door is closed.
Figure 6:
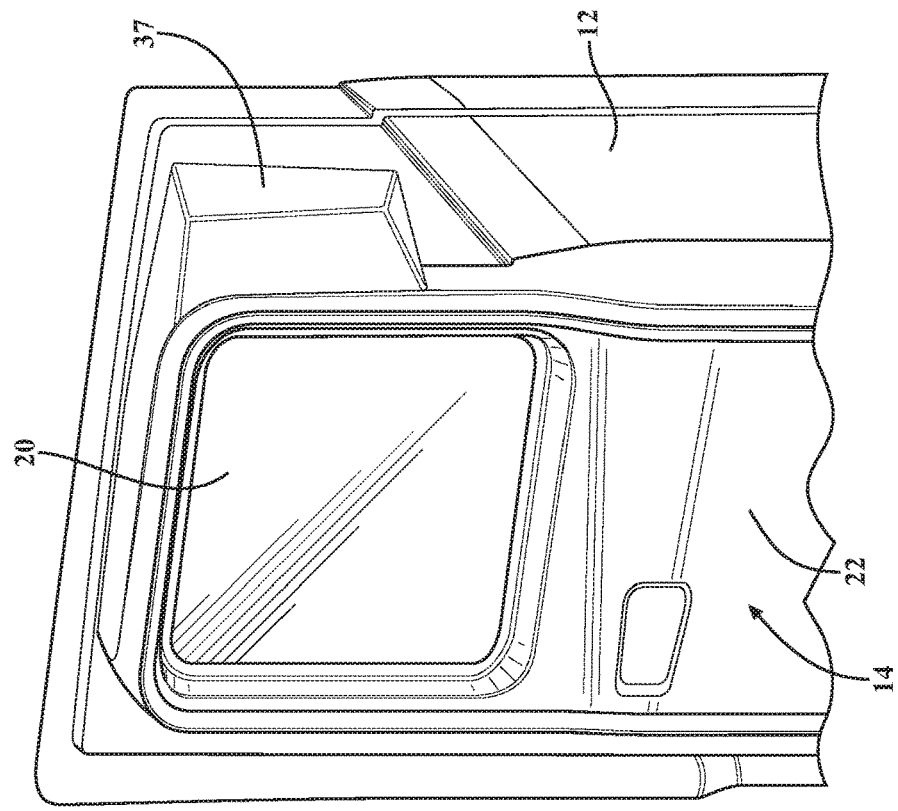
FIG. 6 illustrates an inner side of the body portion and the door portion when the door is closed, including a pocket formed on the body for receiving the hinged bracket.
Figure 5:
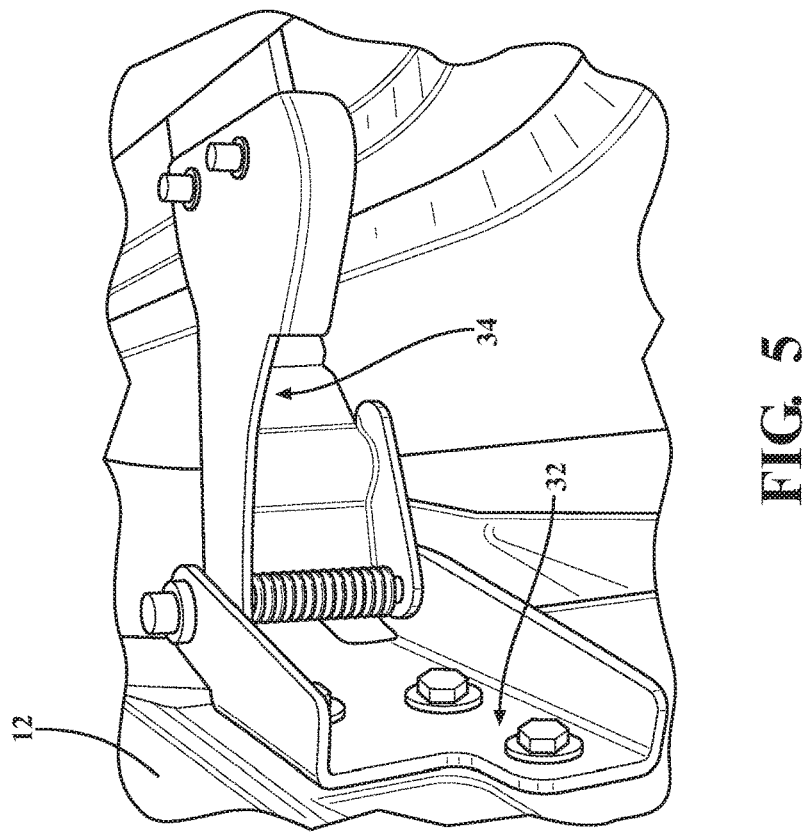
FIG. 5 illustrates the hinged bracket mounted to a body of the vehicle.

As shown in FIG. 1, the door 14 defines a window portion 20 that is surrounded by a panel portion 22. The panel portion 22 defines an outer perimeter that defines the overall shape of the door 14. It will be appreciated that different shapes and perimeters may be used depending on the particular vehicle and corresponding design needs, and that the illustrated door shape is one example. The window portion 20 may be transparent, translucent, or opaque. The window portion 20 may be a separate piece or, in the case of being opaque, the window portion 20 may be integral with the panel portion 22. A separate opaque window portion 20 may also be used.

The panel portion 22 defines an upper section 22a that is disposed above the window portion 20 in a typical vehicle orientation in which the vehicle is oriented horizontally relative to the ground. It will be appreciated that the term "upper" is relative, and that the upper section 22a could be below the window portion 20 if the vehicle is flipped, or beside the window portion 20 if the vehicle is oriented vertically.

For the purposes of discussion, upper, lower, top, bottom, and similar terms are in reference to the vehicle being oriented in a traditional horizontal fashion in which the wheels are touching the ground. Similarly, references to front, rear, and similar terms will refer to typically understood vehicular directions.

The door panel 22 further defines a rear portion 22b that intersects the upper portion 22a at an upper rear corner of the door panel 22. The panel 22 further includes a forward portion 22c that intersects the upper portion 22a at an upper front corner of the door panel 22. A bottom portion 22d extends between the front and rear portions 22c, 22b and below the window portion 20. The bottom portion 22d may have a height that is larger than the height of the window 20. it will be appreciated that other structural arrangements of the portions surrounding the window portion 20 may also be used.

The door panel portion 22 may be in the form of two stamped metal pieces that are bonded or otherwise secured together, thereby defining a panel inner portion and a panel outer portion. The panel inner portion faces the interior of the vehicle. The inner and outer portions may have different shapes in the lateral direction, such that various voids or pockets are defined therebetween. The inner portion defines an inner surface facing the interior of the vehicle, and the outer portion defines an outer surface facing the exterior of the vehicle.

As described previously above, the system 10 includes the track 18, which may also be referred to as a longitudinal track 18. The track 18 is mounted to the door panel 22, and more particularly to the inner surface or inner portion of the door panel 22. In one aspect, the track 18 is disposed on the upper section 22a of the door panel 22 above the window 20. The track 18 extends in a generally longitudinal direction along the door panel 22, and may extend into rear portion 22b at the area where the upper portion 22a and the rear portion 22b intersect. In one aspect, the track 18 may also extend into the front portion 22c.

The inner surface or inner portion of the door panel 22 may include a raised portion 24 at the location where the track 18 extends rearward relative to the window 20. The raised portion 24 may be "raised" relative to the surround structure of the other inner surface portions. The raised portion 24 may be defined by the stamped shape of the inner panel portion, such that a void is created between the raised portion 24 and the laterally adjacent outer panel portion. Alternatively, the raised portion 24 may be a separate structure that is attached, bonded, bolted, or otherwise secured to a generally "smooth" inner panel portion. The raised portion 24 provides support for the track 18 to be mounted to the panel portion 22. The length of the track 18 is related to the degree of travel for the door 14. Thus, the raised portion 24 and length of the track 18 that extends onto the raised portion 24 extends the length of travel relative to a track that terminates at the rear end of the window 20. In some cases, a raised portion may not be used if the rear portion 22b of the panel portion 22 is generally coplanar with the upper portion 22a.

In one approach, the track 18 is in the form of a roll-formed or extruded aluminum or steel structure. Thus, the shape of track 18 may be defined by its cross-section and length. As shown in FIG. 2, the track 18 may include an upper flange portion 18a and a base portion 18b that extends downward from the flange portion 18a. The flange portion 18a may include an upper arm portion 18c that extends inwardly relative to the base portion 18b. A lower arm portion 18d may extend inwardly from a bottom edge of the base portion 18b. The upper and lower arm portions 18c and 18d may include downward and upward extending claw portions 18e and 18f, respectively that extend toward each other, and define a generally vertical slot therebetween in cross-section, with the slot extending longitudinally in the direction of the elongated track 18.

The track 18 may further define an elongate cavity 18g disposed between the claw portions 18e, 18f and the base portion 18b. Thus, the track 18 defines a path along which a bearing structure, such as a roller, may travel as the door 12 is opened.

It will be appreciated that other shapes of elongate tracks may also be used that can cooperate with corresponding bearing structure. For example, the track 18 could be in the form of a rail that travels along rollers. Or the track 18 could have an L-shape or T-shape that slides along a corresponding structure.

The track 18 may be mounted to the inner surface or inner portion of the door panel 22 via rivets 25, in one approach. Alternatively, other fastener types or methods may be used. For example, the track 18 may also be welded or bonded to the inner surface of the door panel 22. The track 18 may be welded or bonded without the use of fasteners, or may be welded or bonded in addition to the use of fasteners. The type of attachment may depend on the material and/or construction of the door panel 22. The track 18 may include mounting holes or the like disposed at various locations along the length of the track to accommodate the rivets 25 or other fasteners. In one aspect, the track 18 may be laterally offset or spaced away from the inner surface of the door panel 22, with a support structure or the like securing the track 18 to the door panel 22.

The vehicle body 12 may include corresponding structure that interfaces with the door-mounted track 18. The vehicle body 12 may include an outer surface or an outer portion that faces the inner surface or inner portion of the door 14. The interfacing structure mounted to the vehicle body 12 may be mounted to the outer surface or outer portion of the vehicle body 12. The interfacing or corresponding structure that cooperates with the track may be selected depending on the type and shape of the track 18.

As shown in FIGS. 3-6, the interfacing or cooperating structure may be in the form of a hinged bracket 30 that may be mounted to the outer surface of the body 12 at a location corresponding to the upper rear corner of the window 20 when the door 14 is closed. Put another way, the hinged bracket 30 is mounted to the body 12 adjacent an upper rear corner of the opening defined by the body 12 that is closed off by the door 14 when the door 14 is closed. In this aspect, the hinged bracket 30 is arranged rearward relative to the window 20 for a door 14 that is opened in the rearward direction. Put another way, the hinged bracket 30 is disposed adjacent an edge portion of the door 14, where the edge portion is disposed on the side of the door 14 in which the door 14 will translate.

The hinged bracket 30 may include a fixed flange portion 32 that is configured to be placed against and mounted to a corresponding surface of the body 12. The fixed flange portion 32 may remain fully fixed and may not shift or otherwise move relative to the vehicle body 12 and/or door 14. However, other portion of the hinged bracket 30 will shift or pivot, as further described below. The body 12 may include a pocket 37 formed in the outer surface or outer portion to accommodate the hinged bracket 30, and provide clearance for the bracket from the inner surface of the door 14. The outer recess or pocket 37 may result in a corresponding bulge or intrusion into the interior of the vehicle, but such intrusion is substantially less than the intrusion required for prior arrangements a fixed-shape arm portion intruded into the vehicle cabin. As described in further detail below, the hinged bracket 30, when the door 14 is closed, has a compressed shape, and when the door opens has an expanded shape, so the recess 37 need only accommodate the size of the hinged bracket 30 when compressed.

The bracket 30 may further include a pivot arm portion 34 that is pivotably connected to the fixed flange portion 32 via a hinge 36. The hinge 36 may include biasing structure, such as a coil spring, that biases the pivot arm portion 34 away from the fixed flange portion 32 to assist with opening the door 14. The hinge 36 may be in the form of a pivot pin connected to both the fixed flange 32 and pivot arm 34. The pivot arm portion 34 may move between a first position and second position when the door 14 moves from the closed to the open position. In the first position, the pivot arm portion 34 may be generally aligned with the fixed flange portion 32, and in the second position, the pivot arm portion 34 may be arranged at an angle to the fixed flange portion 32, thereby transitioning the hinged bracket 30 from the compressed state to the expanded state described above.

Figure 9:
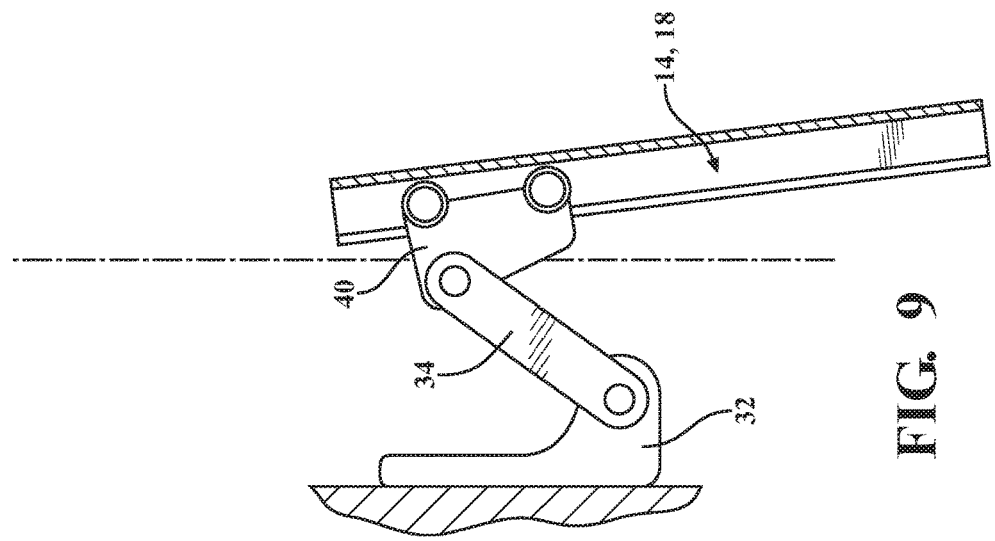
FIG. 9 is a schematic top view of the door in a fully open position, having translated longitudinally rearward, with the hinged bracket open less than in FIG. 8.
Figure 8:
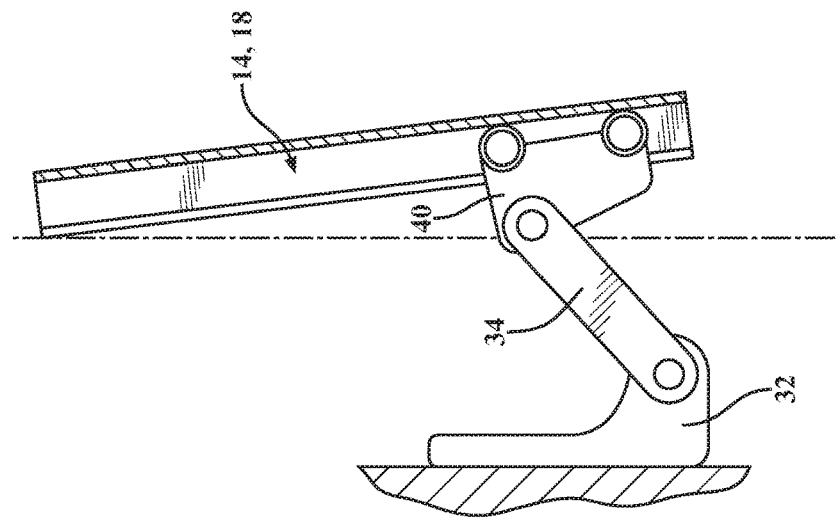
FIG. 8 is schematic top view of the door opening and moving laterally outward, with the hinged bracket open.
Figure 7:
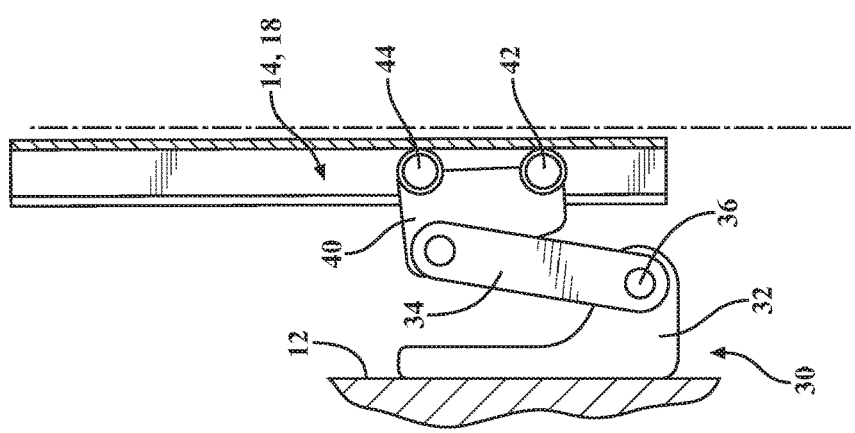
FIG. 7 is a schematic top view of the hinged bracket and a door carrier bracket, with the door in a closed position.

With reference to FIGS. 7-9, the system 10 may further include a door carrier bracket 40 configured to connect to the hinged bracket 30. In particular, the door carrier bracket 40 is attached to the pivot arm 34 of the hinged bracket 30 via a pivot pin 42. The pivot pin 42 attaches to an inner portion of the door carrier bracket 40 and an outer portion of the pivot arm 34. An outer portion of the door carrier bracket includes rollers 44 or other bearing structure that are received in the track 18. Due to the carrier bracket 40 being attached and pivotable to the pivot arm 34, when the pivot arm 34 pivots open, the carrier bracket may move laterally outward while maintaining a similar alignment. Thus, when the pivot arm 34 is pivoted open, the pivot arm 34 may be arranged at an angle relative to the carrier bracket 40.

The door carrier bracket 40 and the hinged bracket 30 remain in generally the same area of the body 12, with the movement of the door carrier bracket 40 being generally limited to a laterally outward movement in response to an outward pivot of the pivot arm 34 away from the fixed flange portion 32 of the hinged bracket 30 when the door 14 is opened and translated longitudinally. Put another way, the hinged bracket 30 and the door carrier bracket 40 thereof do not translate longitudinally along with the door 14 when the door moves. Rather, the track 18 moves along with the door 14, and the track 18 is not fixed to the vehicle body 12 and does not intrude into the vehicle cabin at the interface between the door 14 and the vehicle body 12.

Figure 11:
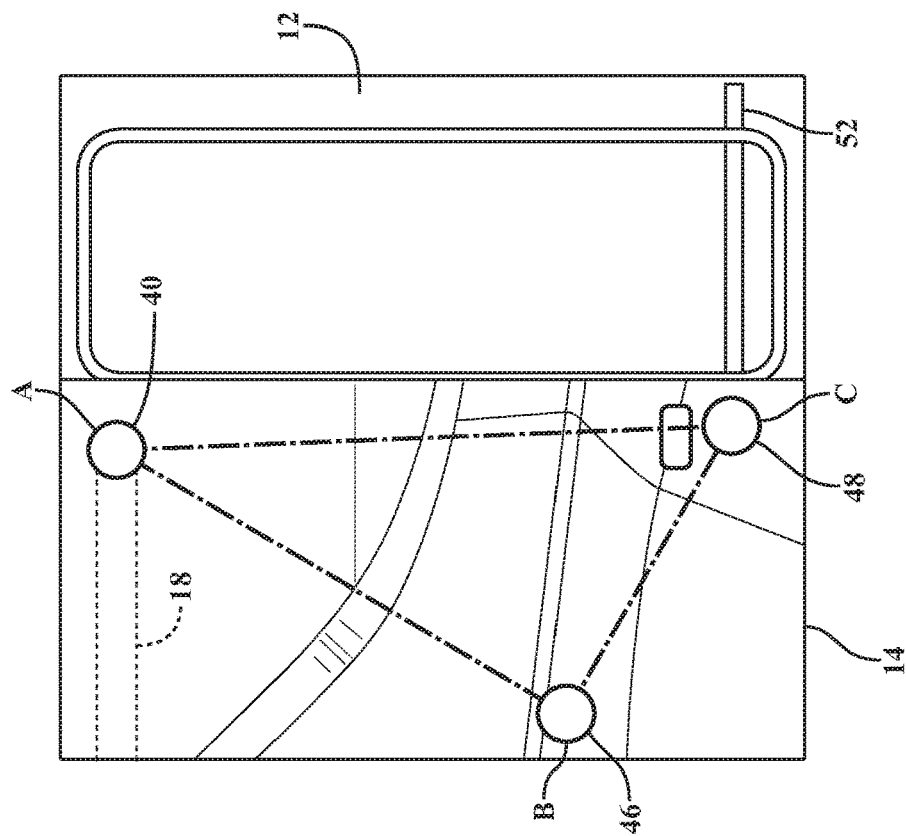
FIG. 11 illustrates the relative locations of the interfaces between the door and the body when the door is fully open.
Figure 10:
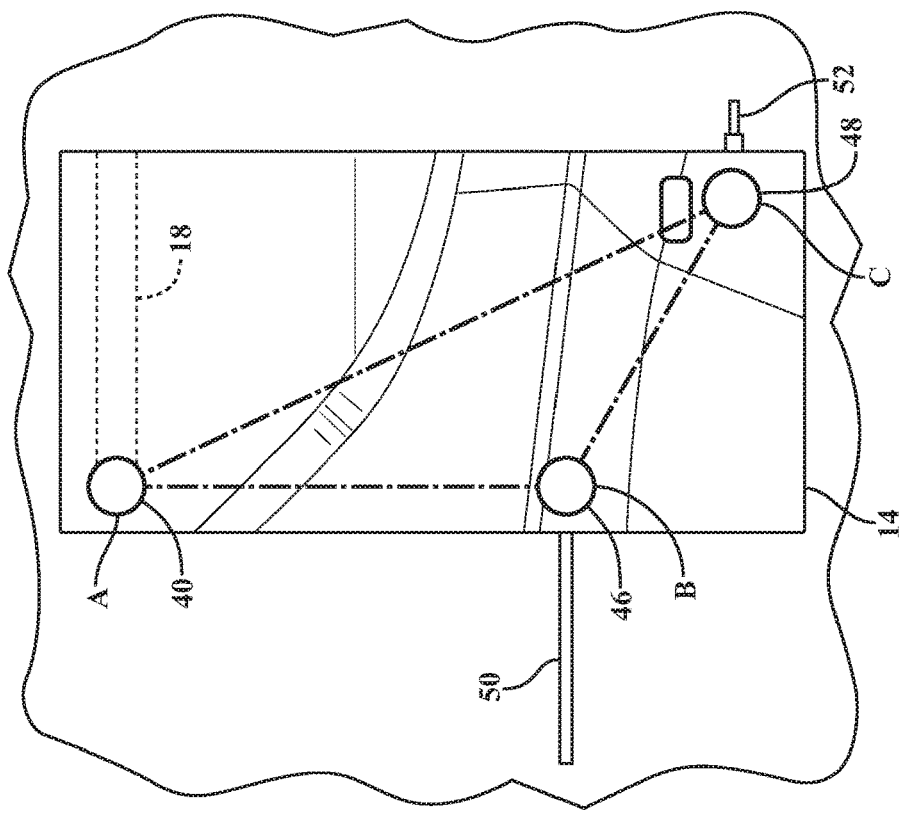
FIG. 10 illustrates the relative locations of the interfaces between the door and the body when the door is closed.

However, the door 14 may be further attached to the body 12 at additional locations, where the door 14 is attached and supported in a slideable manner, as shown in FIGS. 10 and 11. The additional attachment locations may be defined by the attachment of second and third carrier brackets 46 and 48, each of which include rollers. The brackets 46 and 48 are illustrated schematically as an interface location in FIGS. 10 and 11. The structure of the second and third carrier brackets 46 and 48 is not explicitly shown, but it will be appreciated that the carrier brackets 46 and 48 may be of a traditional structure that may slide along a track. The location of the second and third carrier brackets are illustrated with reference to the body 12 and door 14 in both the closed and open position of the door 12 in FIGS. 10 and 11.

The second and third carrier brackets 46, 48 are carried by or on respective intermediate and lower tracks 50 and 52 that are mounted to the body 12. The previously described track 18 may also be referred to as a first track, and the tracks 50 and 52 may be referred to as second and third tracks. The intermediate track 50 is disposed above and rearward relative to the lower track 52. Both tracks 50 and 52 are disposed below the track 18. The lengths of the tracks 18, 50, and 52 may be generally the same, and correspond to the degree of longitudinal travel of the door 14 relative to the body 12 when opened. Of course, the tracks 18, 50, and 52 could also be slightly different lengths, and the corresponding carrier bracket coupled to the corresponding track need not slide or travel the entire length of the corresponding track.

Thus, the door 14 may be secured in a slideable manner to the body 12 at at least three locations in which a carrier bracket interfaces with a track. The interfaces may be referred to as an upper location A, an intermediate location B, and a lower location C. The interfaces may also be referred to as first, second, and third interfaces. The relative positions of these locations A, B, and C when the door 14 is closed differs from when the door 14 is open. The location of an interface generally corresponds to the location of the corresponding carrier bracket. As such, the carrier bracket 40 that is longitudinally fixed relative to the vehicle body 12 results in a generally fixed interface location, while the carrier brackets 46 and 48 attached to the door 14 that translates results in interface locations that are different relative to the vehicle body 12 depending on the state or position of the vehicle door 14.

The location A remains generally fixed relative to the body 12, and is disposed at the location where the hinged bracket 30 and carrier bracket 40 are mounted to the body 12. The locations B and C remain generally fixed relative to the door 14, and are disposed at the attachment locations of the carrier brackets 46 and 48 to the door 14. Thus, location A is generally fixed relative to the vehicle body 12 but moves relative to the door 14, and the locations B and C are generally fixed relative to the door 14 but move relative to the vehicle body 12.

Location B may be disposed at a rear edge of the door 14 and disposed at a location partially between the upper and lower edges of the door 14. Location C is disposed at a lower front corner of the door 14. Location A translates relative to the door 14. Thus, in the closed position of the door 14, location C is at the opposite corner of the door 14 relative to the location A.

Location A is disposed at a rear upper corner of the opening defined by the body 12 that is closed off by the door 14 when the door 14 is closed. Locations B and C translate relative to the body 12. Thus, when the door 14 is open, locations A and C are no longer at opposite corners of the door 14.

The door 14 has a first position, shown in FIG. 10, which may also be referred to as the closed position. The door 14 also has a second position, shown in FIG. 11, which may also be referred to as the fully opened position. The door 14 further has a continuously intermediate position, which may also be referred to as a sliding position or moving position, which occurs in the transition between open and closed positions. When the door moves, the spacing and distances between the positions A, B, and C will change due to location A being fixed to the body 12 and locations B and C being fixed to the door 14, which moves relative to the body 12.

In the closed position, position A is disposed generally above position B and longitudinally aligned with position B. Position A is disposed above and rearward from position C in the closed position. Track 18 is disposed generally above and longitudinally aligned with lower track 52 in the closed position. It will be appreciated that these relative positions may vary from those shown in FIG. 10. For example, location A may be slightly forward or rearward from location B. Carrier bracket 40 is in generally the same longitudinal position in both the open and closed positions, and position A remains in generally the same position.

In the open position, positions B and C are moved rearward relative to the closed position. Position B is rearward and below Position A. Position C is below and generally longitudinally aligned with Position A, although there may be a slight longitudinal offset between positions A and C in the open position. The track 18 is moved rearward relative to the closed position, and is disposed above and longitudinally aligned with the intermediate track 50 and rearward from lower track 52. Tracks 50 and 52 are in the same position in the closed position as in the open position.

As mentioned above, the spacing between each of the interfaces is different as the door 14 moves between the closed and open positions, because of the carrier brackets being disposed on either the door 14 or the body 12. For example, Position A is closer to position C in the open position relative to the closed position. Position A is closer to position B in the closed position relative to the open position. Position A is closer to position B than position C in the closed position. Position A is closer to position C than position B in the closed position. These relative distances or spacings can be seen in FIGS. 10 and 11.

Similarly, the angles defined between imaginary lines extending between locations A, B, and C will change. For example, a reference to Line AB refers to a line extending between locations A and B, etc. In the closed position, the angle between Line AC and line BC is less than the corresponding angle when the door is open. The angle between Line AB and Line BC is smaller in the open position relative to the closed position.

Thus, as shown, the track 18 and brackets 46 and 48 translate longitudinally with the door 14 relative to the generally fixed positions of the hinged bracket 30, carrier bracket 40, and tracks 50 and 52, which remain in the same general area relative to the body 12.

The above arrangement is in contrast to prior designs in which an upper track is mounted to a vehicle body, and carrier brackets or arms are fixed to the sliding door.

When the door 14 is in the closed position, the hinged bracket 30 is in a closed position, where the pivot arm 34 overlies the fixed flange 32, and the carrier bracket 40 overlies the pivot arm 34, as shown in FIG. 7. The bearings 44 of the carrier bracket 40 may be aligned generally parallel to the fixed flange 32. This may also be referred to as the compressed state.

When the door opens, the pivot arm 34 pivots outward relative to the hinge 36, with the outer end of the pivot arm 34 carrying the pivot pin 42 moving laterally outward relative to the closed position and rearward relative to the closed position, as shown in FIG. 8. This may be referred to as the expanded state. The door 14 will shift laterally outward at its connection to the carrier bracket 40, such that the door 14 will shift at an angle relative to the closed position and relative to the class A surface of the vehicle. When the door 14 initially opens, the carrier bracket 40 will be disposed at the rear end of the track 18 and the door 12.

As shown in FIG. 9, after the door 14 has moved to the fully open position, the pivot arm 34 is still open relative to the closed position, but the pivot arm 34 is pivoted back toward the fixed flange 32, such that the pivot pin 42 is disposed laterally inward relative to the initial opening position. This may also be referred to as the expanded state. The carrier bracket 40 is disposed at the front end of the track 18 and the door 14 when the door 14 is fully open. These different positions are also shown in FIGS. 10 and 11.

In the closed position, the hinged bracket 30 and carrier bracket 40 are in a laterally compressed shape relative to the open position. The laterally compressed shape may be less intrusive into the vehicle cabin than prior designs in which a curved track and an arm extended into the vehicle interior to define the laterally outward travel path of the door. The laterally outward movement of the door 14 in the present system is supplied by the outward pivoting of the pivot arm 34 of the hinged bracket 30.

The above described arrangement reduces the intrusion into the vehicle cabin caused by prior tracks and arms that extended into the vehicle interior. The track and arm would typically be disposed in a space between the vehicle roof and the headliner of the vehicle. This can be undesirable in instances where the upper portion of the door is significantly below the roofline of the vehicle. The above described arrangement allows for a fixed interface rearward from the door opening when the door 14 is open, and maintains a large spread between interface points A, B, and C throughout the translation of the door 14 relative to the body between open and closed positions.

By fixing the track 18 to the vehicle door 14 rather than the vehicle body 12, the above-described advantage of limiting the intrusion of a track and arm into the vehicle cabin is realized. Additionally, there are further advantages of the disclosed arrangement. One additional advantage of the disclosure is that for many vehicles with sliding doors, the manufacturer may offer multiple options for the roof height. In these variable roof height cases, the traditional body-mounted upper track must be installed at the top of the door opening. As a result, the manufacturer must design multiple variants of the door to accommodate different installation locations for the upper track. The present disclosure, in which the bracket 30 is fixed to the vehicle body adjacent the door opening, allows for a common location to be used for varying door and roof heights. Put another way, multiple door heights with common track locations may be used for various roof heights.

Another advantage of the present disclosure is that the disclosure allows for the ability to implement a common door size to be used across multiple roof height configurations, which is not feasible for a traditional body-mounted track, because the upper body-mounted track intrudes laterally into the vehicle interior. As described above, the traditional body-mounted track must be installed near the roof. As such, a higher roof would require a higher door that would reach the higher mounted track. In the present disclosure, with the track 18 mounted to the vehicle door 14, the intrusion of the track into the vehicle cabin is not present. Thus, a common door size may be used across variants, enabling the use of space above the door for other purposes, such as packaging and installation of interior items like cabinets, racks, or the like. Put another way, multiple roof heights may be used with a common door and door opening.

The above described arrangement refers to the track 18 being the track that is mounted to the door 14 with the hinged bracket 30 and the carrier bracket 40 being generally fixed on the vehicle body 12, such that the door 14 and track 18 mounted thereto will move rearward in unison relative to the brackets. This arrangement may also be utilized for the intermediate track 50 instead of fixing the track to the vehicle body. Instead, the track 50 may be mounted to the door 14 similar to the track 18, with similar a hinged bracket and carrier bracket arrangement as described above with respect to the track 18. This arrangement may also reduce intrusions into the passenger space of the vehicle. This alternative arrangement of the intermediate track 50 may be used in addition to the arrangement of the track 18 described above, or as an alternative to the arrangement of the track 18 described above, with the upper track 18 having a traditional arrangement in which it is fixed to the vehicle body. It will be appreciated that such modifications or alternatives may result in different relative locations of the interface points between the door 14 and the vehicle body than those shown in FIGS. 10 and 11.

Thus, in view of the above, the benefits of the previously described door mounted track 18 may be applied to other locations of a track on the door, and that this arrangement and the benefits thereof are not only limited to the uppermost track of a sliding door system.

The above described arrangement is described in reference to a door that slides rearward to open. It will be appreciated that the above described arrangement could similarly be used for a door that slides forward, with the interfaces and movements described as "rear" or "rearward" being "front" or "forward" respectively. Put another way, the above described arrangement of components could be mirrored for a forward opening sliding door.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility.

What is claimed is:
1. A system for a sliding door in a vehicle, the system comprising:
   a vehicle body defining an opening;
   a vehicle door configured to engage the opening in a closed position and to disengage from the opening in an open position, wherein the vehicle door is offset laterally and translated longitudinally relative to the vehicle body in the open position relative to the closed position;
   a longitudinal track fixed to the vehicle door;
   a hinged bracket fixed to the vehicle body adjacent the opening of the vehicle body and interfacing with the longitudinal track;
   wherein the hinged bracket is moveable between a first position and a second position;
   wherein, when the door is in the closed position, the hinged bracket is in the first position and is laterally compressed;
   wherein, when the door is open, the hinged bracket is in the second position and is laterally expanded, and the track is translated longitudinally relative to the body and the hinged bracket;

wherein the hinged bracket is mounted to an outer surface of the vehicle body, and is disposed between the outer surface of the vehicle body and an inner surface of the vehicle door when the vehicle door is in the closed position; wherein the outer surface of the vehicle body defines a recessed pocket, and the hinged bracket is disposed within the recessed pocket.

2. The system of claim 1, wherein the longitudinal track is fixed to the inner surface of the vehicle door.

3. The system of claim 2, wherein the hinged bracket is longitudinally fixed to the vehicle body.

4. The system of claim 1, wherein the hinged bracket includes a fixed flange portion mounted to the vehicle body.

5. The system of claim 4, wherein the hinged bracket includes a pivot arm portion pivotably connected to the fixed flange portion.

6. The system of claim 5, wherein the pivot arm portion is biased away from the flange portion.

7. The system of claim 6, wherein the hinged bracket includes a door carrier bracket attached to the pivot arm, wherein the door carrier bracket includes bearings that are received within the longitudinal track.

8. The system of claim 7, wherein when the door moves from the closed position to the open position, the pivot arm portion pivots outward relative to the flange portion, the door carrier bracket shifts laterally outward when the pivot arm portion pivots outward, and the longitudinal track translates longitudinally relative to the door carrier bracket.

9. A system for a sliding door in a vehicle, the system comprising:
    a vehicle body defining an opening;
    a vehicle door configured to engage the opening in a closed position and to disengage from the opening in an open position, wherein the vehicle door is offset laterally and translated longitudinally relative to the vehicle body in the open position relative to the closed position;
    a longitudinal track fixed to the vehicle door;
    a hinged bracket fixed to the vehicle body adjacent the opening of the vehicle body and interfacing with the longitudinal track;
    wherein the hinged bracket is moveable between a first position and a second position;
    wherein, when the door is in the closed position, the hinged bracket is in the first position and is laterally compressed;
    wherein, when the door is open, the hinged bracket is in the second position and is laterally expanded, and the track is translated longitudinally relative to the body and the hinged bracket;
    wherein the hinged bracket includes a first carrier bracket coupled to the longitudinal track, wherein the longitudinal track is a first longitudinal track, and the first longitudinal track and hinged bracket define a first interface location, the system further comprising a second and third carrier bracket coupled to a respective second and third longitudinal track, wherein the second and third longitudinal tracks are fixed to the vehicle body and the second and third carrier brackets are fixed to the vehicle door, wherein the second carrier bracket and second longitudinal track define a second interface location and the third carrier bracket and third longitudinal track define a third interface location, wherein second and third carrier brackets translate with the vehicle door when the vehicle door is opened such that the second and third interface locations are different when the vehicle door is open relative to the when the vehicle door is closed;
    wherein the first interface location is disposed above the second interface location, and the second interface location is disposed above the third interface location and the second and third interface location are offset longitudinally; wherein the second and third longitudinal tracks are offset longitudinally, and the first longitudinal track is longitudinally aligned with the third longitudinal track in the closed position and the first longitudinal track is aligned with the second longitudinal track in the open position.

10. The system of claim 9, wherein the third interface location is spaced further from the first interface location in the closed position relative to the open position, and the second interface location is closer to the first interface location in the closed position relative to the open position, and the second and third interface locations are spaced apart at approximately the same distance in both the open and closed positions.

11. A method for opening a sliding door of a vehicle, the method comprising:
    releasing a vehicle door from engagement with an opening defined by a vehicle body;
    opening a hinged bracket laterally outward relative to the vehicle body, wherein the hinged bracket is fixedly attached to the vehicle body and longitudinally slidably attached to a longitudinal track that is fixedly mounted to the vehicle door, wherein the opening of the hinged bracket shifts the vehicle door laterally outward relative to the body; and
    longitudinally translating the longitudinal track and the vehicle door relative to the hinged bracket to longitudinally open the vehicle door;
    wherein the hinged bracket is mounted to an outer surface of the vehicle body and disposed between the outer surface of the vehicle body and an inner surface of the vehicle door when the vehicle door is closed; wherein the outer surface of the vehicle body defines a recessed pocket, and the hinged bracket is disposed within the recessed pocket.

12. A system for a sliding door in a vehicle, the system comprising:
    a vehicle body defining an opening;
    a vehicle door configured to engage the opening in a closed position and to disengage from the opening in an open position, wherein the vehicle door is offset laterally and translated longitudinally relative to the vehicle body in the open position relative to the closed position;
    a first longitudinal track fixed to the vehicle door;
    a hinged bracket fixed to the vehicle body adjacent the opening of the vehicle body and having a first carrier bracket interfacing with the first longitudinal track at a first interface location;
    wherein the first longitudinal track translates longitudinally when the door moves from the closed position to the open position;
    wherein the system further includes second and third longitudinal tracks fixed to the vehicle body and second and third carrier brackets respectively coupled to the second and third longitudinal track, wherein the second and third carrier brackets are fixed to the vehicle door, wherein the second carrier bracket and second longitudinal track define a second interface location and the third carrier bracket and third longitudinal track define a third interface location;

wherein the first longitudinal track is longitudinally aligned with the third longitudinal track in the closed position and the first longitudinal track is longitudinally aligned with the second longitudinal track in the open position.

13. The system of claim 12, wherein second and third carrier brackets translate with the vehicle door when the vehicle door is opened such that the second and third interface locations are different when the vehicle door is open relative to the when the vehicle door is closed.

14. The system of claim 12, wherein the first interface location is disposed above the second interface location, and the second interface location is disposed above the third interface location, and the second and third interface location are offset longitudinally.

15. The system of claim 12, wherein the hinged bracket is mounted to an outer surface of the vehicle body, and is disposed between the outer surface of the vehicle body and an inner surface of the vehicle door when the vehicle door is in the closed position, wherein the hinged bracket is laterally compressed when the door is in the closed position and laterally expanded when the door is in the open position.

16. The system of claim 12, wherein, in both the open and closed positions of the vehicle door, the second and third longitudinal tracks are offset longitudinally, and the second and third interface locations are offset longitudinally.

\* \* \* \* \*